Figure 1:
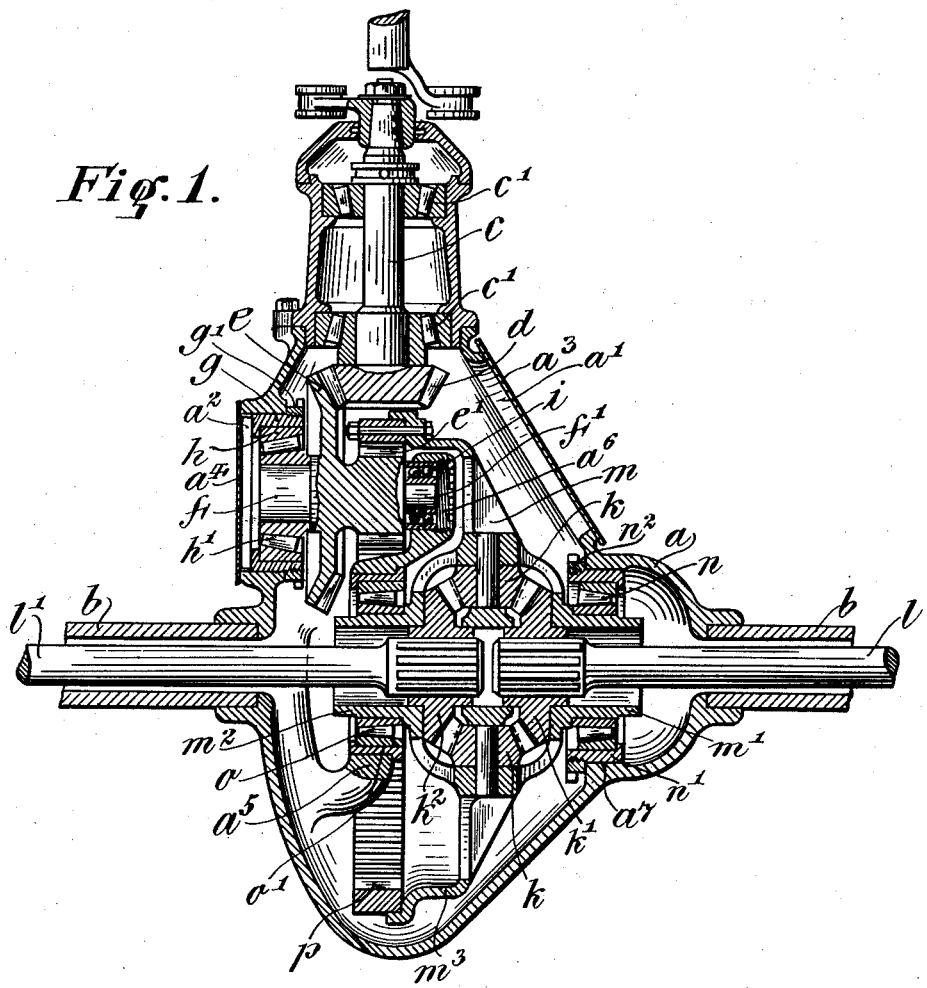

M. C. FRINS.
REAR AXLE DRIVE FOR MOTOR VEHICLES.
APPLICATION FILED APR. 11, 1919.

1,326,655.

Patented Dec. 30, 1919.
2 SHEETS—SHEET 1.

WITNESS:

INVENTOR
BY
ATTORNEYS

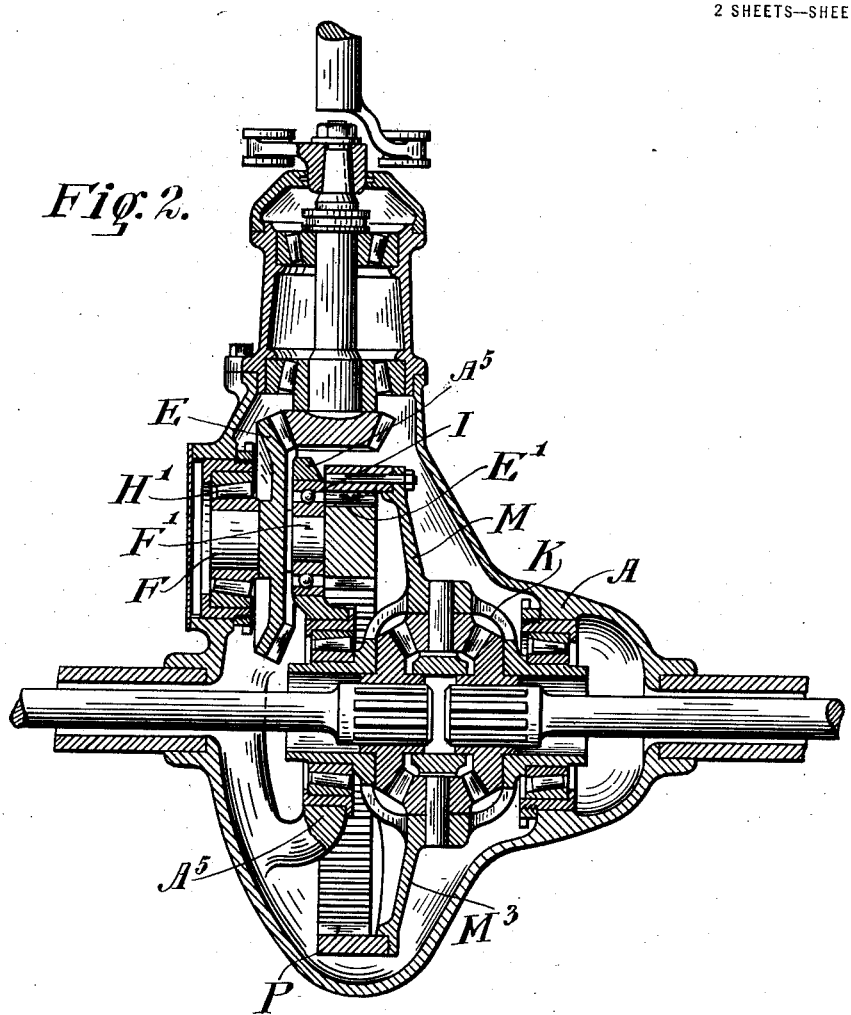

UNITED STATES PATENT OFFICE.

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

REAR-AXLE DRIVE FOR MOTOR-VEHICLES.

1,326,655.  Specification of Letters Patent.  Patented Dec. 30, 1919.

Application filed April 11, 1919. Serial No. 289,278.

*To all whom it may concern:*

Be it known that I, MAXIMILIAN C. FRINS, a citizen of the United States, residing in the borough of Manhattan of the city of New York, in the State of New York, have invented certain new and useful Improvements in Rear-Axle Drives for Motor-Vehicles, of which the following is a specification, reference being had to the accompanying drawings, forming a part hereof.

This invention relates to an improved construction for rear axle drives for motor vehicles in which there is employed a double reduction at the differential. The general object of the invention is to improve constructions of this type by making them more compact, accessible and rugged than heretofore and mounting the elements and their bearings in a housing of improved design. The features of construction by which these objects are attained will appear in greater detail in connection with the description of the embodiments shown in the drawings in which, Figure 1 is a view in horizontal section showing the improved drive in association with the axle sections.

Fig. 2 is a view similar to Fig. 1 but showing a somewhat different disposition of the bearings within the housing.

The differential housing $a$ is mounted on the dead axle sections $b$ and has formed therein suitable openings $a'$, $a^2$, among others, to permit ready access to certain of the elements mounted within the housing as will hereinafter be referred to. These openings will be, of course, closed by suitable caps $a^3$, $a^4$. Extending into the front end of the housing is the drive shaft $c$, the section of which within the housing may be supported on suitable roller bearings $c'$. This shaft carries at its end a bevel pinion $d$ which meshes with a bevel gear $e$, the hub of which has formed thereon a spur gear $e'$ for the double reduction of speed, as will appear. The gears $e$, $e'$, may have formed integral therewith, or be keyed on, a shaft section $f$, $f'$, by which the gears are journaled in the housing. In the illustrated embodiment the housing at the opening $a^2$ therein is provided with a bearing ring $g$ locked in place by a retaining ring $g'$ and adapted to receive a bearing race $h$ on which the shaft section $f$ is mounted as by means of roller bearings $h'$. The other end of the shaft section $f'$, extending from the face of the spur gear $e'$, may be supported on a ball bearing $i$ carried in a rib $a^5$ cast on the inner wall of the housing $a$. This bearing $i$ is retained in place in the opening formed therefor in the rib $a^5$ by means of a retaining ring $a^6$ threaded into the opening for the bearing. A differential gear designated generally by the character $k$ includes bevel gears $k'$, $k^2$, which are splined on the inner ends of the axle sections $l$, $l'$ respectively, in a manner well known. A carrier $m$ for the differential is provided and this carrier is formed at opposite sides of the differential with annular flanges $m'$, $m^2$, by which the differential is journaled in the housing $a$ in an approved manner. One of the annular flanges $m'$ is supported on a roller bearing $n$ which is carried by a bearing ring $n'$ supported on an annular shoulder $a^7$, provided therefor at one side of the interior of the housing $a$. This bearing ring $n'$ is removably locked in place by a screw ring $n^2$. The other annular flange $m^2$ of the carrier $m$ is journaled on a roller bearing $o$ carried in a bearing ring $o'$ supported in an annular way provided therefor within the rib $a^5$ of the housing $a$. The differential carrier $m$ is also formed with a circular spider $m^3$ to which is bolted an internal master gear $p$ with which meshes the spur gear $e'$ for the driving of the differential.

From the description given it will be evident that the power from the propeller shaft $c$ is transmitted through the large bevel gear $e$ and the spur gear $e'$ to the internal gear $p$ on the differential carrier $m$, with a double reduction as is desirable in motor practice for certain types of vehicles, particularly trucks. By the features of construction described with particularity it is also evident that this double reduction drive at the rear axle is attained with maximum compactness, strength, and accessibility, the housing $a$ being so formed as to support the necessary bearings for the driving elements in a most advantageous manner.

In the somewhat modified form shown in Fig. 2 the same general construction and arrangement of associated parts is employed excepting so far as concerns the relation of the large bevel gear E and the spur gear E' and the supporting bearings H', I provided therefor. In this embodiment the rib $A^5$ of the housing A is so formed as to extend along the wall of the casing between the bevel gear E and the spur gear E'. Accordingly the shaft section F' of the spur gear E' extends between the spur gear and the bevel gear E and the bearing I is disposed within an annular way formed therefor in the rib $A^5$ between the said two gears. The other shaft section F which, as before pointed out, may either be formed separate from or integral with the bevel gear E and the other shaft section F', is journaled, as in the other embodiment, in the bearing H'. The spider $M^3$ of the differential carrier M in the form shown in Fig. 2 has secured thereto an internal gear P with which meshes the spur gear E' for actuation of the differential in the manner hereinbefore described.

The scope of the invention will appear from the appended claims.

I claim as my invention:

1. In a motor vehicle in combination, a propeller shaft, a differential mechanism, a driving pinion on the propeller shaft, a gear with which the driving pinion meshes, a second gear rotatable with the first gear, said differential mechanism including a circular spider formed thereon, an internal gear carried by the spider and in mesh with the second named gear, a housing for all of said gears and bearings carried in the housing for said gears.

2. In a motor vehicle in combination, a propeller shaft, a differential mechanism, a driving bevel pinion on the propeller shaft, a bevel gear with which the driving pinion meshes, a spur gear rotatable with the first gear, a master internal gear carried with the differential mechanism and in mesh with the second named gear to effect a speed reduction, a housing for all of said gears, and bearings carried in the housing for said gears.

This specification signed this ninth day of April, A. D. 1919.

MAXIMILIAN C. FRINS.